B. C. BIBB & H. AUGEE.

Base-Burning Fire-Place Heater.

No. 4,941. Reissued June 11, 1872.

WITNESSES, Jno. B. Harding.
John Parker

B. C. Bibb
David Stuart
Richard Petersen
by their Attys.
Howson and Son

AM. PHOTO-LITHOGRAPHIC CO. N.Y. (OSBORNE'S PROCESS.)

UNITED STATES PATENT OFFICE.

BENTLEY C. BIBB AND HENRY AUGEE, OF BALTIMORE, MARYLAND; SAID AUGEE ASSIGNOR TO DAVID STUART AND RICHARD PETERSON, OF PHILADELPHIA, PENNSYLVANIA.

IMPROVEMENT IN BASE-BURNING FIRE-PLACE HEATERS.

Specification forming part of Letters Patent No. 32,176, dated April 30, 1861; reissue No. 4,941, dated June 11, 1872.

Specification describing an Improvement in Stoves, for which Letters Patent No. 32,176 were granted April 30, 1861, to BENTLEY C. BIBB and HENRY AUGEE, of Baltimore, county of Baltimore, State of Maryland.

This invention relates to an improvement in stoves of the class known as fire-place stoves; and our improvement consists in combining in a stove of this class a body partly projecting into the room and an inner receptacle, as fully described hereafter, a greater radial heat being obtained by the combination of these features than in stoves of this class as made prior to this invention.

Figure 1:
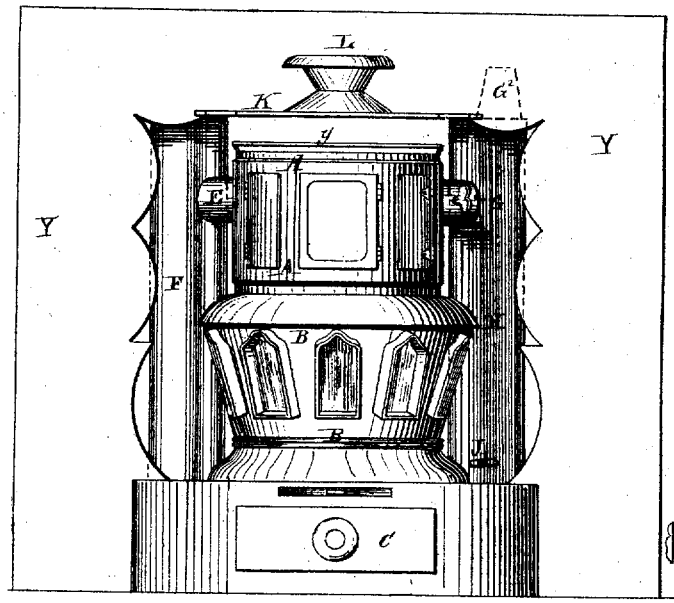
Figure 2:
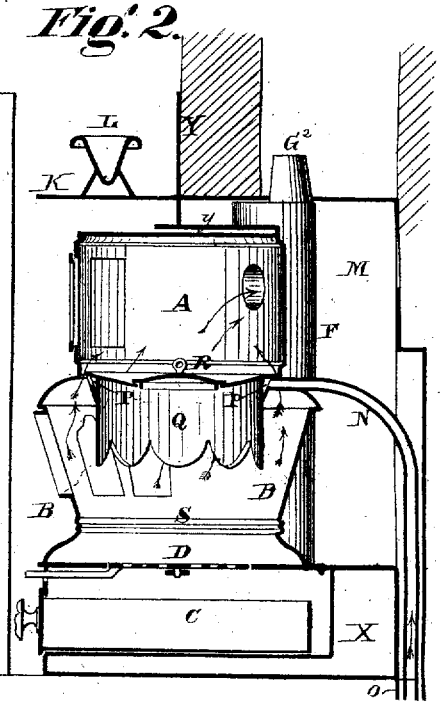
Figure 3:
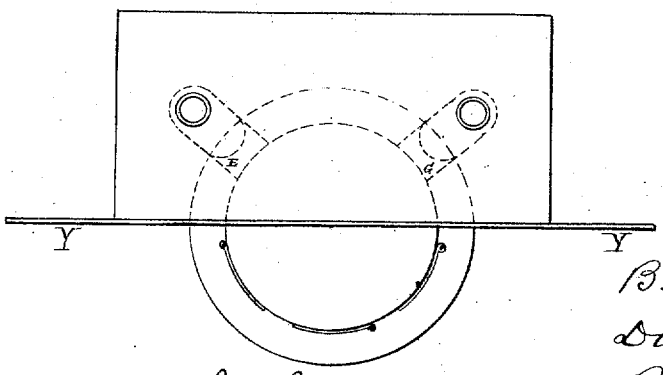
Figure 4:
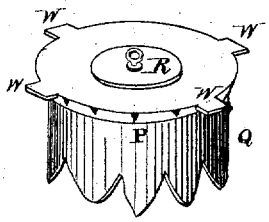

Figure 1 is a front view of the stove; Fig. 2, a vertical section; Fig. 3, a plan view; and Fig. 4, a perspective view of the receptacle.

The stove partakes in many respects of the characteristics of ordinary fire-place stoves or heaters; but there are prominent features which render it a marked improvement on stoves of this class. The main feature of the invention is the protrusion of one-half, or thereabout, of the stove into the room, an arrangement which, viewed in connection with the receptacle, adds greatly to the capacity of the stove as a disseminator of radial heat, in the manner fully explained hereafter. The stove itself has a base containing the ash-drawer C, and on this base rests the casing B, furnished with the usual mica panels, and inclosing the fire-chamber S, at the bottom of which is the usual grate D, the casing B being surmounted with a cylinder, A, for receiving the products of combustion. This cylinder communicates through two short pipes, G and E, with vertical pipes H and F, one situated on each side of the main body of the stove. The top of the pipe F is closed, and its lower end communicates with the space X in the base of the stove, with which space the pipe H also communicates, the said pipe terminating in a pipe, $G^2$, extending into the chimney. When a damper, I, in the pipe G is closed, and a valve, J, in the pipe H open, the products of combustion will pass through the pipes E and F to the space X in the base of the stove, and thence, through the pipe H, to the chimney; but, on closing the valve J and opening the damper I, the products of combustion will escape directly through the pipes G and H to the chimney. This arrangement of pipes and dampers for regulating the draught and changing the course of the products of combustion is common to stoves of this class. A receptacle, Q, is so suspended within the fire-chamber by its lugs W, resting on the top of the casing B, that there shall be an annular space between the receptacle and casing A for the free passage of the products of combustion to the upper cylinder A. The receptacle is closed at the top with the exception of a central opening for the admission of fuel, and to this opening is fitted a detachable cover, R. Round the upper portion of the receptacle extends an annular chamber, P, which communicates with the open air through a pipe, N, the chamber being perforated, as shown in Fig. 3, so that jets of cold air will meet the products of combustion as they pass from the fire-chamber to the upper chamber A. Owing to the presence of the receptacle, the products of combustion are directed outward, as shown by the arrows, toward the casing B of the fire-chamber, an important feature when viewed in connection with the protrusion of half of the stove into the room, as more fully explained hereafter.

The above-described stove, the operation of which will be readily understood without description, is placed in a casing, M, fitted into the chimney-place, the frame or front plate Y of this casing fitting against the mantel or wall. It will be noticed in Fig. 2 that one-half, or thereabout, of the stove projects beyond the frame Y. In the present instance there is a horizontal plate or shelf, K, projecting from the frame, and situated above the stove, this shelf serving the twofold purpose of supporting an evaporating-vessel, L, and of directing the heated air derived from the back of the stove into the room.

Pure air is introduced through a channel, *o*, communicating with the external air into the interior of the casing M, where it is heated by contact with the stove and its pipes prior to passing into the room above the stove. A plate, *y*, attached to and situated a short distance above the top of the stove, serves to prevent the heat of the latter from being communicated to the top of the casing M.

Prior to this invention it had been the practice to so place fire-place stoves within the chimney-place that no part of the stove projected beyond the frame Y or mantel; hence the radial heat derived from the stove was, in a great measure, absorbed by the surrounding casing and wall instead of being made available for heating the room. By so placing the stove within the fire-place, however, that one-half, or thereabout, projects beyond the mantel, as described, the room necessarily obtains more radial heat. The protrusion of the stove, however, would not add greatly to the radial heat if constructed in the ordinary manner—that is, without a receptacle—for in that case the products of combustion would pass directly to the chimney, and the heat imparted by them to the casing of the fire-chamber would be restricted. The receptacle, however, causes the flame to seek and pass in contact with or in such close proximity to the said casing that it must heat the same to a degree which induces a great radial heat from its outer surface. The increased heating properties of the stove, therefore, are derived, not by the protuberant body alone, nor by the presence of the receptacle alone, but by both combined.

We therefore claim as the invention of the said BIBB and AUGEE—

A fire-place stove, one-half, or thereabout, of which projects beyond the mantel or frame, and which contains an inner receptacle so arranged that the products of combustion shall pass between the receptacle and the casing of the stove, substantially as described.

In testimony whereof we have signed our names to this specification in the presence of two subscribing witnesses.

BENTLEY C. BIBB.
DAVID STUART.
RICHARD PETERSON.

Witnesses:
WM. A. STEEL,
LOUIS BOSWELL.